(12) United States Patent
Flesch et al.

(10) Patent No.: US 7,814,153 B2
(45) Date of Patent: Oct. 12, 2010

(54) SYSTEM AND METHOD FOR CLIENT SIDE MANAGED DATA PRIORITIZATION AND CONNECTIONS

(75) Inventors: Robert S. Flesch, Atlanta, GA (US); William H. Andrew, Decatur, GA (US)

(73) Assignee: Prototerra, Inc., Atlanta, GA (US)

( * ) Notice: Subject to any disclaimer, the term of this patent is extended or adjusted under 35 U.S.C. 154(b) by 1362 days.

(21) Appl. No.: 10/800,397

(22) Filed: Mar. 12, 2004

(65) Prior Publication Data

US 2005/0216558 A1    Sep. 29, 2005

(51) Int. Cl.
G60F 15/16    (2006.01)
G06F 15/173    (2006.01)

(52) U.S. Cl. .................................. 709/205; 709/225

(58) Field of Classification Search ................ 709/203, 709/204, 227, 206, 207, 205, 225, 228; 715/706, 715/756, 771
See application file for complete search history.

(56) References Cited

U.S. PATENT DOCUMENTS

| | | | | | |
|---|---|---|---|---|---|
| 5,736,982 | A * | 4/1998 | Suzuki et al. | ............... | 715/706 |
| 6,049,341 | A * | 4/2000 | Mitchell et al. | ............. | 345/473 |
| 6,166,727 | A * | 12/2000 | Kozuka | ....................... | 715/203 |
| 6,396,509 | B1 * | 5/2002 | Cheng | ........................ | 715/706 |
| 6,442,432 | B2 * | 8/2002 | Lee | .............................. | 607/59 |
| 6,772,195 | B1 * | 8/2004 | Hatlelid et al. | .............. | 709/204 |
| 6,795,972 | B2 * | 9/2004 | Rovira | .......................... | 725/40 |
| 6,925,495 | B2 * | 8/2005 | Hegde et al. | ................. | 709/223 |
| 7,139,732 | B1 * | 11/2006 | Desenberg | .................... | 705/37 |
| 7,269,632 | B2 * | 9/2007 | Edeker et al. | ............... | 709/217 |
| 7,366,775 | B2 * | 4/2008 | Taylor | ........................ | 709/224 |
| 2002/0099499 | A1 * | 7/2002 | Takayama et al. | ........... | 701/200 |
| 2002/0103597 | A1 * | 8/2002 | Takayama et al. | ........... | 701/200 |
| 2002/0118186 | A1 * | 8/2002 | Matsuda | ...................... | 345/419 |
| 2003/0078972 | A1 * | 4/2003 | Tapissier et al. | ............ | 709/204 |
| 2003/0158957 | A1 * | 8/2003 | Abdolsalehi | ................. | 709/231 |
| 2005/0030309 | A1 * | 2/2005 | Gettman et al. | ............. | 345/419 |
| 2005/0114204 | A1 * | 5/2005 | Kim et al. | ..................... | 705/14 |
| 2005/0193120 | A1 * | 9/2005 | Taylor | ........................ | 709/227 |
| 2008/0201425 | A1 * | 8/2008 | Baker | ......................... | 709/204 |
| 2010/0115103 | A1 * | 5/2010 | Tagg | ........................... | 709/227 |
| 2010/0115104 | A1 * | 5/2010 | Tagg | ........................... | 709/227 |

* cited by examiner

*Primary Examiner*—Lashonda T Jacobs
*Assistant Examiner*—Sargon N Nano
(74) *Attorney, Agent, or Firm*—Haynes and Boone LLP

(57) ABSTRACT

The present disclosure provides a structure and method for client-side management of communications channels. In one example, the method includes determining a maximum number of simultaneous connections N supportable by a client. This may be based on such factors as network connection speed and processing power of the client. Between one and N entities that meet a predefined criterion may then be identified. For example, if the client is controlling an avatar in a virtual world, then the criterion may be a distance from the avatar. Permission to communicate with the client may then be granted to the identified entities, and permission to communicate with the client held by entities that are not among the identified entities may be revoked.

16 Claims, 8 Drawing Sheets

US 7,814,153 B2

SYSTEM AND METHOD FOR CLIENT SIDE MANAGED DATA PRIORITIZATION AND CONNECTIONS

BACKGROUND

The present disclosure relates generally to the field of network traffic data management and, more particularly, to a system and method for managing data prioritization and connections by a client.

Data networks operate by transferring data between various devices. The amount of data that can be handled simultaneously by a network is generally constrained by the network's bandwidth. Accordingly, high bandwidth applications, such as voice communications, may use much or all of a network's bandwidth. Furthermore, even if the network has unused bandwidth capacity in one area, a single link (e.g., to a user's computer) may be burdened due to heavy traffic on that link. This traffic burden becomes even more pronounced if multiple data streams (e.g., multiple conversations) are occurring simultaneously. Not only does this require network resources, but it also places additional stress on the user's computer.

Accordingly, what is needed are an improved system and method for managing data traffic on a network.

DETAILED DESCRIPTION

Figure 1:
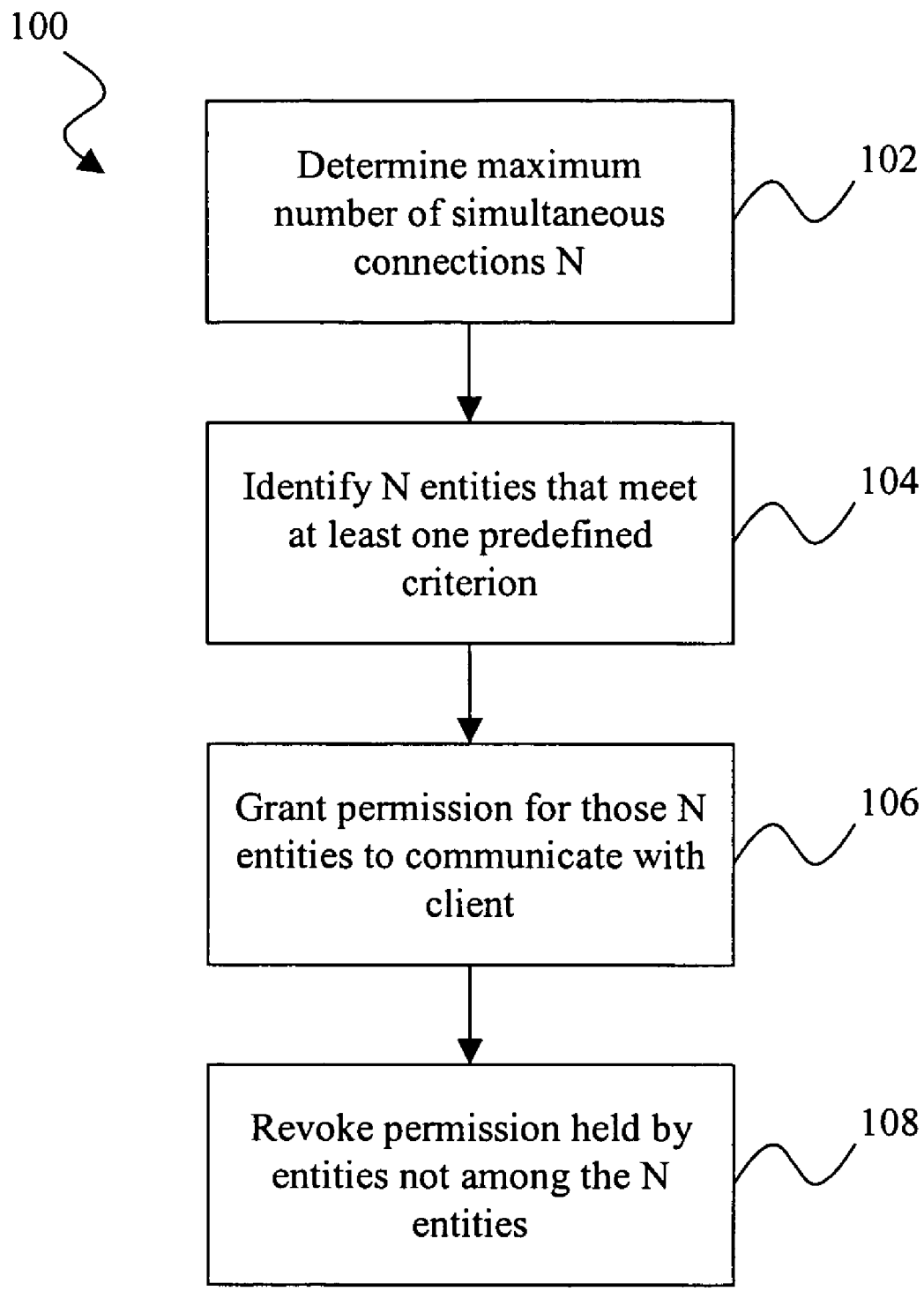
FIG. 1 is a flow chart of one embodiment of a method for client-side management of connections.

The present disclosure relates generally to the field of network traffic data management and, more particularly, to a system and method for managing data prioritization and connections by a client. It is understood, however, that the following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, in one embodiment, a method 100 may be used to automatically make and break communications (e.g., data channel or sessions) between a user entity (e.g., a device such as a computer or a software object residing on such a computer or on a server) and other entities. The entities may be computers, personal digital assistants (PDAs), cellular telephones, or any other device capable of communicating with one or more other devices, as well as avatars (e.g., in a virtual world) or other software objects residing on either a device itself or on a server accessible to the device. In the present example, the method 100 is executed by a client (e.g., the user's computer) to control communications with other entities. As will be described later with reference to a specific example, the client may use permission-based control either inform an entity that it is authorized to send information to the client or to revoke such authorization. The client sends a permission message, which may be an unsolicited message that is sent from the client to another entity via a reliable transmission protocol, that allows the entity to establish a data channel with the client if the channel meets requirements determined by the entity. It is understood that, although an entity may not send information to the client without first receiving the client's permission in the present example, in some embodiments, an entity may be authorized to send the information unless informed that it may not do so by the client.

In step 102, the client determines a maximum number of simultaneous connections N. The value of N may depend on available bandwidth, device capabilities (e.g., processor speed, memory bandwidth, memory access times, etc.) of the client, application specific information (e.g., one application may require more bandwidth or processing power than another application), and/or other parameters. The connections may be for any type of data, including real time voice data.

In step 104, up to N entities may be identified that meet at least one predefined criterion. The predefined criterion may include, for example, a distance (e.g., the closest N entities or all N entities within a particular range), an entity type (e.g., only entities having a particular hardware or software configuration), or any other desired parameter by which an entity may be selected or filtered. In some embodiments, multiple criteria may be used for greater selectivity. For example, if more than N entities are within a predefined range, then they may be further filtered based on their operating systems. In the present example, the method 100 identifies the N closest entities.

In step 106, the client grants permission for the N identified entities to communicate with the client. The permission may be granted via a message sent directly to each specific entity, via a message that is broadcast with entities receiving permission identified in the broadcast (e.g., by internet protocol (IP) address and/or media access control (MAC) number)), or may be sent in other ways.

In step 108, the client may revoke permission from entities that previously had permission but are not currently among the N identified entities. For example, if the client has moved from a location where an entity was granted permission as one of the N closest entities (at that time), then the entity may no longer be one of the N closest entities. Accordingly, the client may revoke its permission to communicate with the client.

The method 100 may provide more efficient use of bandwidth by preventing all of the entities from sending information to the client, which may ignore or discard any information that it cannot handle. Furthermore, bandwidth saturation resulting from too much data being transferred over a connection may result in lost packets and other problems that affect existing communications. As the client may only be able to establish and maintain a limited number of communication channels, the method 100 may enable the client to maximize its bandwidth usage by minimizing or eliminating undesired communications.

It is understood that each entity may be a client. Accordingly, while the client described with respect to FIG. 1 may not give an entity permission to communicate, the entity may still send some messages to the client. For example, an entity (as a client) may have a larger value of N than the client (e.g., due to more bandwidth or more processing power). Accordingly, the entity may send the client a permission message granting permission to communicate, even though the client may not reciprocate with a permission message because the entity may not be within its N identified entities. Furthermore, the lack of permission may not negate all communications, but may instead only negate the establishment of a particular channel, such as a data channel for voice communications.

Figure 2:
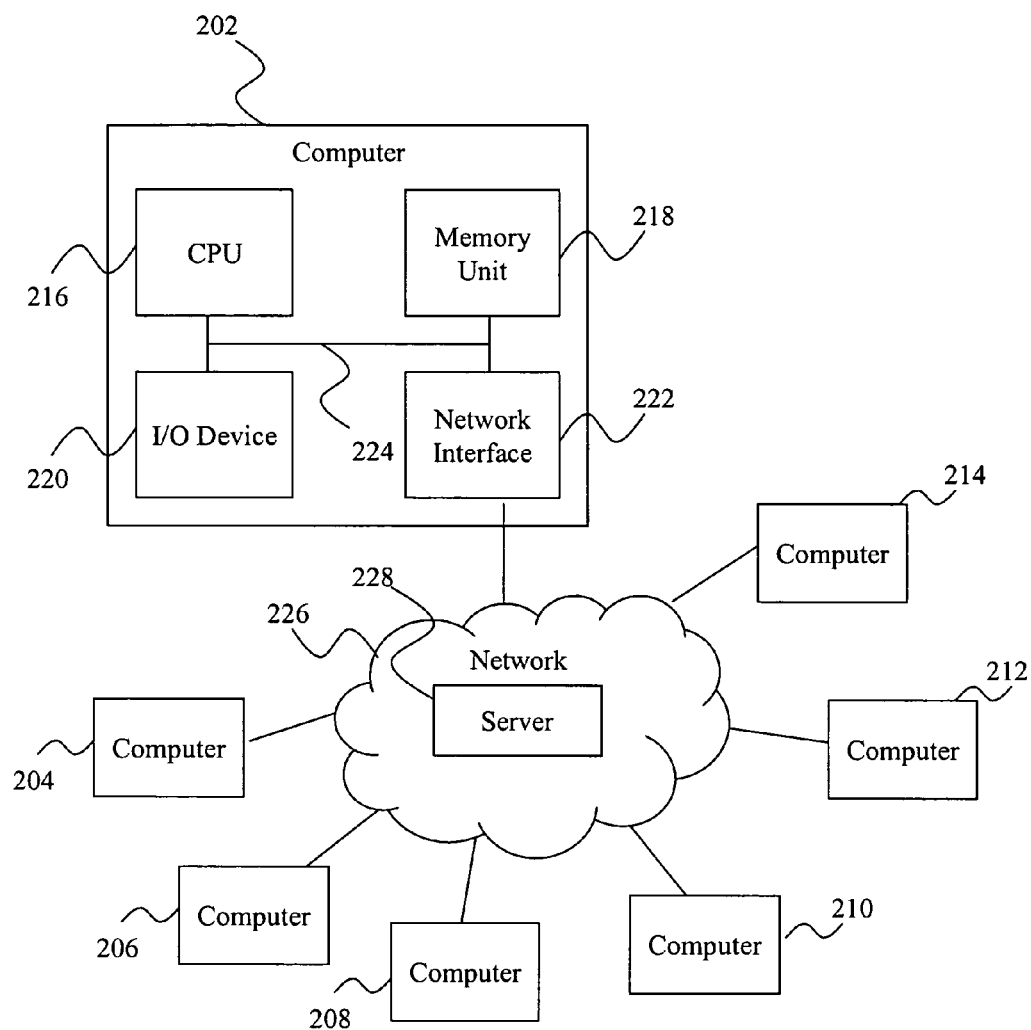
FIG. 2 is a schematic of an exemplary network within which the method of FIG. 1 may be executed.

Referring now to FIG. 2, an exemplary network 200 illustrates one environment within which the method 100 of FIG. 1 may be executed. The network 200 includes multiple devices 202, 204, 206, 208, 210, 212, and 214. Each device may be a computer, PDA, cellular telephone, or any other device capable of communicating with one or more other devices. In the present example, the devices 202-214 are computers. For purposes of illustration, the computer 202 is illustrated in greater detail. The computer 202 may include a central processing unit ("CPU") 216, a memory unit 218, an input/output ("I/O") device 220, and a network interface 222. The network interface may be, for example, one or more network interface cards (NICs) that are each associated with a MAC address. The components 216, 218, 220, and 222 are interconnected by a bus system 224. It is understood that the computer may be differently configured and that each of the listed components may actually represent several different components. For example, the CPU 216 may actually represent a multi-processor or a distributed processing system; the memory unit 218 may include different levels of cache memory, main memory, hard disks, and remote storage locations; and the I/O device 220 may include monitors, keyboards, and the like.

The computer 202 may be connected to a network 226. The network 226 may be, for example, a subnet of a local area network (LAN), a wide area network (WAN), a company wide intranet, and/or the Internet. Furthermore, the network 226 may support wireless and/or wired communications using a variety of protocols, and may include equipment (not shown) needed to provide such support. In the present example, the network 226 includes a server 228, although it is understood that the server 228 may be connected to the network 226 in a manner similar to that of the computers 202-214. The computers 202-214 may communicate in multiple ways, including via the server 228 and/or in a peer-to-peer setting.

To communicate, two of the computers may establish a data channel that represents the exchange of data between the two computers. Such a channel may be private (established only between two computers) or may public (data may be sent from a computer to one or more other computers).

For voice communications, which are analog in nature, the computer 202 may use a codec (COde/DECode) to encode the analog signal into a digital format to send to another computer, which then uses the codec to decode the digital signal back into analog format before playing it for a user. Depending on the particular codec, one second of analog voice data translates into a rate of bits/second that are the digital representation of that analog data. This is referred to as the bitrate. For example, if a codec has a bitrate of 8 Kb/sec, it means that the codec can generate a digital representation of one second of analog data using 8 Kb.

In a voice-over IP (VoIP) system, one way to decrease the amount of bandwidth is to only send data when there is data to be sent (e.g., when someone is actually speaking). This is a switched voice stream. For purposes of the following example, a non-switched voice stream is used. This means that using the previously described codec (e.g., a codec that has a bit rate of 8 Kb/s) involves transmitting the 8 Kb as a continuous stream, regardless of whether the user is speaking or not.

Because the computer 202 may be connected to the network 226, certain components may, at times, be shared with other computers 204-214. Therefore, a wide range of flexibility is anticipated in the configuration of the computer 202. Furthermore, it is understood that, in some implementations, the computer 202 may act as a server to other computers 204-214. Each computer 202-214 may be identified on the network by an address (e.g., an IP address) and, in some instances, by the MAC address associated with the network interface of the relevant computer.

In the present example, the server 228 includes software instructions for a virtual world (not shown). The virtual world enables users of the computers 202-214 to log into the server 228 and interact through the use of avatars that represent each user within the virtual world. For example, each avatar may represent a customizable human figure with customizable clothing, accessories, and other virtual possessions. Using their respective avatar, each user may move through the virtual world, communicating with each other and interacting with each other and with the world itself.

Continuing the previous example, the following parameters exist: the data stream is a non-switched data stream, the codec has a bitrate of 8 Kb/s, and the computer 202 has a bandwidth of 56 Kb/s up/down.

Accordingly, if the virtual world (or a room in the virtual world) has N avatars attempting to carry on a live voice conversation, the following equation may be used to determine the transmission rate for any avatar in the room:

$$(N-1)*b=d$$

where N is the number of avatars in the room, b is the bitrate, and d is the aggregate bit rate for transmitting to all the other avatars in the room. Given that all avatars are transmitting at the same bitrate, the same equation may be used to calculate the reception rate.

Accordingly, for a room containing four avatars, the one way data-rate would be 24 Kb/s as calculated by the equation:

$$(4-1)*8 \text{ Kb/s}=24 \text{ Kb/s}$$

If a ceiling (the bandwidth limitation) is applied, the following should be true:

$$d<1$$

where d is the aggregate bit rate for transmitting to all the other avatars in the room, and 1 is the limit of the available bandwidth (e.g., 56 Kb/s). Based on this, the limit may be calculated as 7 avatars by using:

$$(7-1)*8 \text{ Kb/s}=48 \text{ Kb/s}<56 \text{ Kb/s}$$

Accordingly, under ideal conditions, there can be up to 7 avatars in the room with no loss of data, but if another avatar enters the room, then the bandwidth is saturated. Due to the streaming nature of voice data, such saturation is unacceptable, especially when the selection of what data is lost is non-deterministic or arbitrary. In some situations, it may be more preferable to lose an entire stream of data than to lose portions of all of them. An exemplary solution may be provided by a method 300 of FIG. 3, described below.

Figure 3:
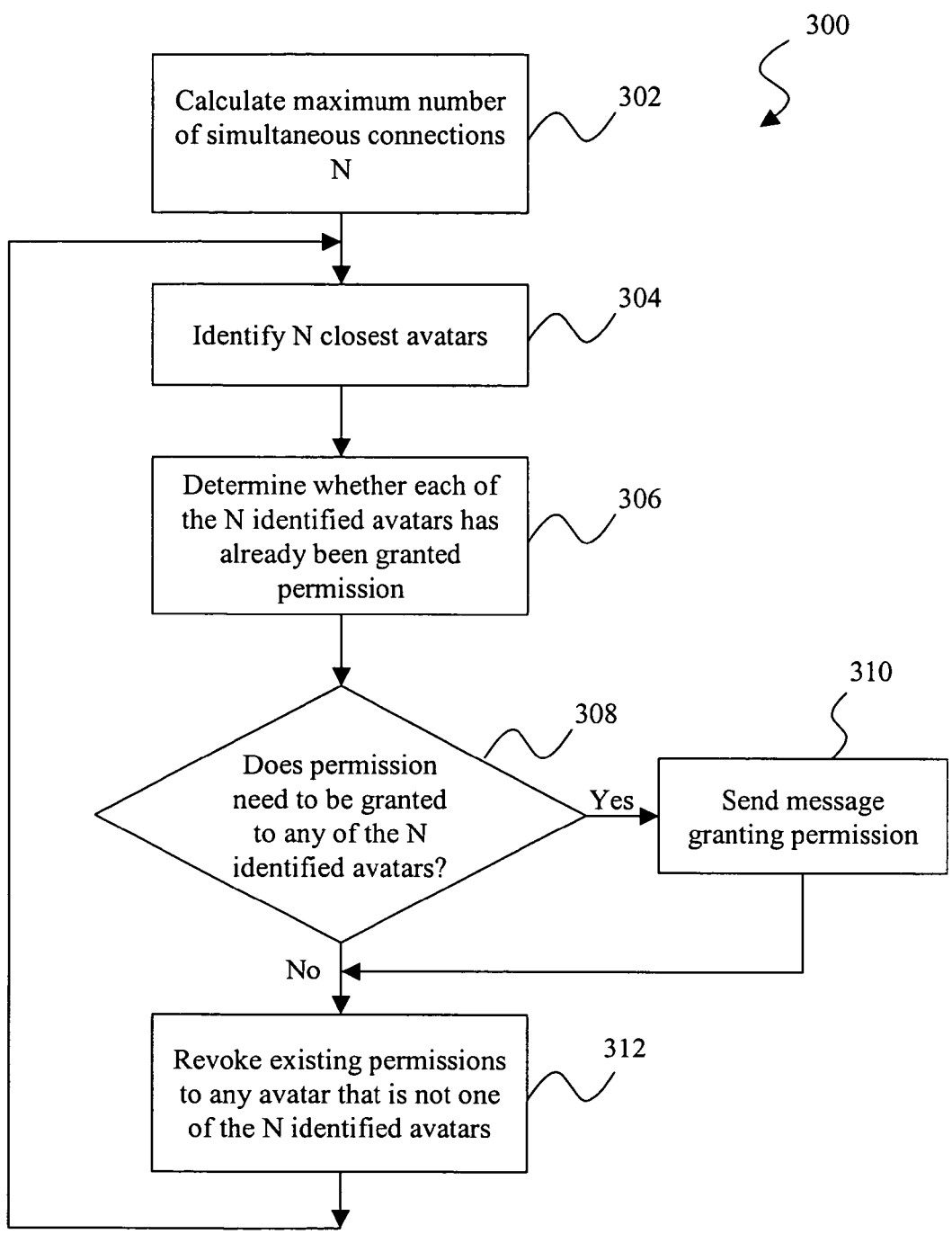
FIG. 3 is a flow chart of another embodiment of a method for client-side management of connections.

With additional reference to FIG. 3, an exemplary method 300 may be executed on one or more of the computers 202-214 to control interaction with the other computers. Accordingly, while the server 228 may control the virtual world, each computer 202-214 may control which of the other computers are allowed to communicate with it using permission messages. Each permission message is an unsolicited message that is sent from one of the computers (the client) to another of the computers via a reliable transmission protocol that allows the other computer to establish a data channel with the client if the channel meets requirements determined by the other computer. The data channel represents the exchange of data between the client and the other computer. Such communications may be routed through the server or may be peer-to-peer, depending on the specifics of the virtual world and/or other software instructions executed on the server 228 and computers 202-214.

For purposes of clarity, it is understood that references to an avatar include the computer controlling the avatar. For example, if it is stated that an avatar sends a permission message, it may be the computer controlling the avatar that actually sends the message. Similarly, if a reference is made to an avatar speaking, it is understood that it is actually the user speaking through the avatar.

Figure 4:
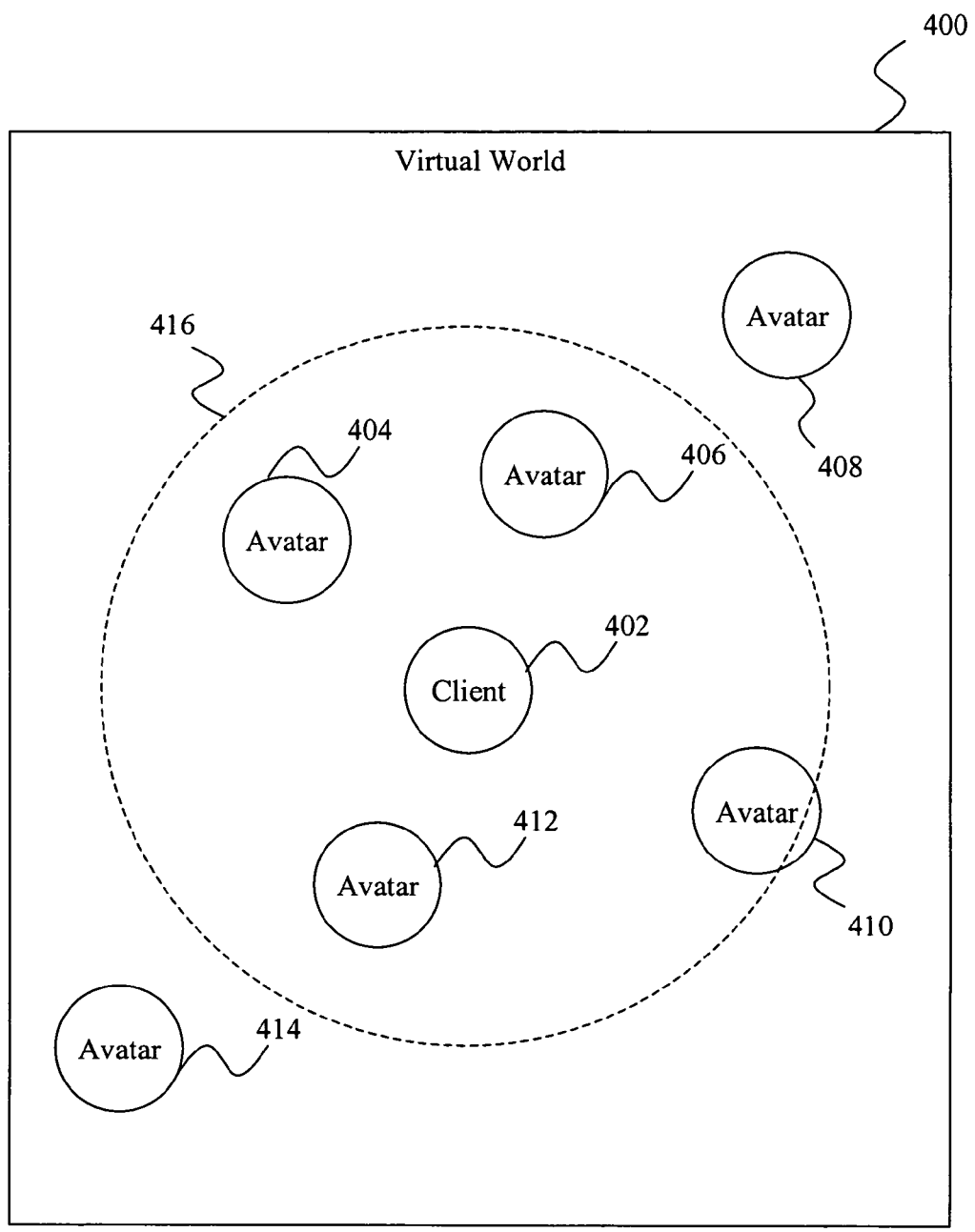
FIG. 4 illustrates an exemplary virtual world environment within which the method of FIG. 3 may be used to control connections between avatars.

With additional reference to FIG. 4, a virtual world 400 includes a plurality of avatars 402, 404, 406, 408, 410, 412, and 414 that correspond to the computers 202, 204, 206, 208, 210, 212, and 214, respectively. For purposes of example, the avatar 402 is the client (although it is understood that each of the other avatars may also be a client) and the computer 202 is the client computer.

In step 302 (FIG. 3), a maximum number of simultaneous connections N that are supported by the computer 202 is determined. In the present example, the value N is based on a speed of the network connection between the user's computer 202 and the network 226, as well as on a speed of the CPU 216. This determination may be made by a program executed by the computer 202 (as in the present example) or may be made by supplying the information to another computer, such as the server 228. Accordingly, N may vary depending on the particular computer for which the value is being calculated. A computer having a broadband connection and a 2.2 GHz processor may have a higher N value (e.g., may be able to establish more simultaneous connections) than a computer having a dial up connection and a 450 MHz processor. To continue the previous example of FIG. 2, the computer 202 has a bandwidth limitation of 56 Kb/s and uses a codec with a bitrate of 8 Kb/s. As described previously, this would generally allow up to 7 connections. However, in the present example, the CPU of the computer 202 is unable to handle 7 simultaneous connections, but is able to handle up to 4. Accordingly, N=4 for the computer 202, and the corresponding avatar 402 may communicate simultaneously with up to four other avatars within the virtual world 400.

In step 304, the N closest avatars to the avatar 402 are identified by the computer 202 using, for example, coordinate information for each avatar received from the server 228. As such information may be received by the computer 202 for purposes of updating activity within the virtual world 400, no additional information may need to be transferred for purposes of making the determination. This determination results in the selection of the avatars 404, 406, 410, and 412, as illustrated by the circle 416 of FIG. 4.

In steps 306 and 308, a determination may be made as to whether each of the avatars 404, 406, 410, and 412 already has permission. This determination may be made by checking a permission table stored on the client computer 202 (e.g., Table 1 below) or the server 228, by checking a flag associated with each of the avatars 404, 406, 410, and 412, or by other means. For purposes of example, the avatar 402 has just entered the virtual world 400, and so none of the avatars 404, 406, 410, and 412 have been granted permission to communicate with the avatar 402, as illustrated by Table 1 below.

TABLE 1

| Avatar Name | Permission | N closest |
|---|---|---|
| 404 | N | Y |
| 406 | N | Y |
| 410 | N | Y |
| 412 | N | Y |
| ... | ... | ... |

Accordingly, the method moves to step 310, where the computer 202 sends a permission message to each of the computers 204, 206, 210, and 212, and updates the permission table, as illustrated in Table 2 below. This informs the computers that their respective avatars are allowed to communicate with the computer 202 (and its avatar 402).

TABLE 2

| Avatar Name | Permission | N closest |
|---|---|---|
| 404 | Y | Y |
| 406 | Y | Y |
| 410 | Y | Y |
| 412 | Y | Y |
| ... | ... | ... |

In step 312, the computer 202 may send a message revoking existing permission to any computer corresponding to an avatar that currently has permission but is not one of the computers 204, 206, 210, and 212. As this is not applicable in the current scenario, no such message needs to be sent. The method 300 may then return to step 304 to identify the N closest avatars.

Figure 5:
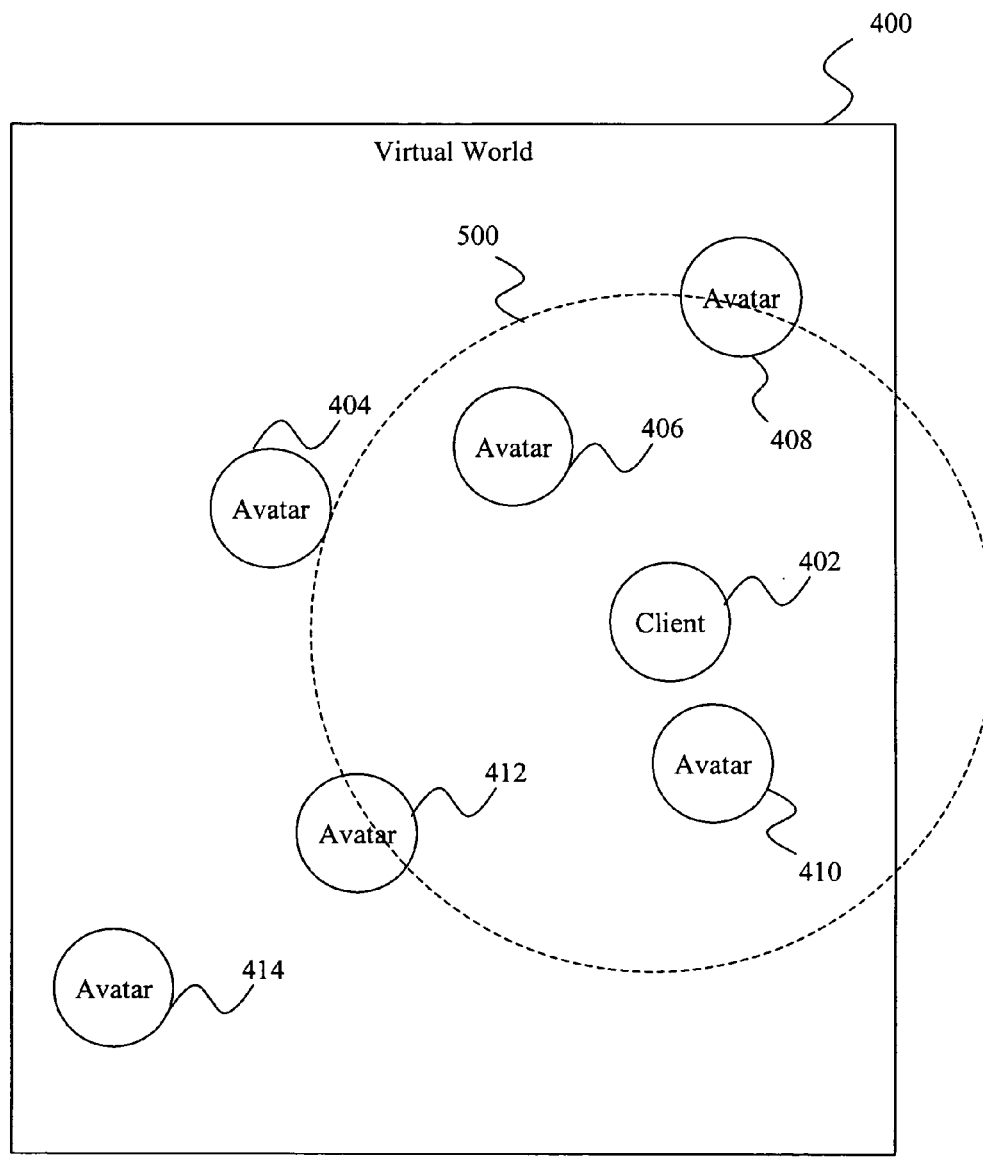
FIG. 5 illustrates the exemplary virtual world environment after an avatar has moved relative to other avatars.

With additional reference to FIG. 5, the avatar 402 is shown as having moved within the virtual world 400. Accordingly, after the method 300 returns to step 304, a different group of avatars may be identified. More specifically, the four closest avatars are now identified in step 304 as the avatars 406, 408, 410, and 412, as indicated by the circle 500. Table 3 illustrates the changes to the permission table following this step.

TABLE 3

| Avatar Name | Permission | N closest |
|---|---|---|
| 404 | Y | N |
| 406 | Y | Y |
| 408 | N | Y |
| 410 | Y | Y |
| 412 | Y | Y |
| ... | ... | ... |

In steps 306 and 308, the determination may be made as to whether each of the identified avatars has been granted permission. Continuing the current example, the avatars 406, 410, and 412, have already been granted permission, but the avatar 408 has not. Accordingly, the method 300 moves to step 310, where a message is sent to the computer 208 to grant permission. This change is reflected in Table 4 below.

TABLE 4

| Avatar Name | Permission | N closest |
|---|---|---|
| 404 | Y | N |
| 406 | Y | Y |
| 408 | Y | Y |
| 410 | Y | Y |
| 412 | Y | Y |
| ... | ... | ... |

In step 312, any permission granted to an avatar that is no longer one of the four identified avatars may be revoked. Accordingly, as the avatar 404 is no longer one of the identified avatars but has permission, the permission is revoked (as shown below in Table 5). It is understood that, in some embodiments, the permission may be revoked prior to granting permission to the newly identified avatars.

TABLE 5

| Avatar Name | Permission | N closest |
|---|---|---|
| 404 | N | N |
| 406 | Y | Y |
| 408 | Y | Y |
| 410 | Y | Y |
| 412 | Y | Y |
| ... | ... | ... |

It is understood that entries may be added to and removed from the permission table. For example, the entry for the avatar 404 may be removed from Table 5 when permission is revoked. This enables the size of the table (and any corresponding memory requirements) to be minimized. However, in some embodiments, the avatar 404 may be left in Table 5 so that, for example, an entry need not be created if the avatar 404 is again among the N nearest avatars. Accordingly, carious changes may be made to the permission table for optimization or other purposes. These changes may be varied based on factors such as the size of the virtual world 400, the number of avatars present, or other factors. In some embodiments, the client computer 202 ma dynamically alter how the permission table is maintained in order to adjust to or compensate for changes in the virtual world 400. In addition, all avatars may be represented on the permission table in some embodiments.

In is understood that other parameters may be defined to further filter the selected avatars. For example, an additional criterion may require that the identified N avatars be within a predefined distance. If some or all of the identified avatars are further from the user's avatar than the predefined distance, then they may be excluded. In a virtual world, this may be used to create a more realistic setting as avatars at longer distances may be blocked even if less than N avatars are within range (e.g., a voice range or bounding sphere may be defined to exclude distances that a voice may not realistically travel). Accordingly, additional filtering may occur as desired. Furthermore, it is understood that the client computer 202 may reserve one or more communication channels for a user defined avatar or computer. This enables the user to talk to an avatar that is not one of the N closest avatars. In some embodiments, the avatar may even be out of sight of the user's avatar, but a communication channel may be established or maintained.

In some embodiments, a user may block or allow certain permission messages. For example, a user may block permission messages that are to be sent to a computer representing an avatar with which the user does not want to communicate. In this embodiment, the user may be prompted to block or allow the message, or the message may be automatically blocked based on a predefined list created by the user. Furthermore, in some embodiments, a blocked avatar may not be counted among the N identified avatars. Using FIG. 5 as an example, if the user blocks the avatar 410, then the avatar 404 may be included among the four identified avatars that are to receive permission.

Figure 6:
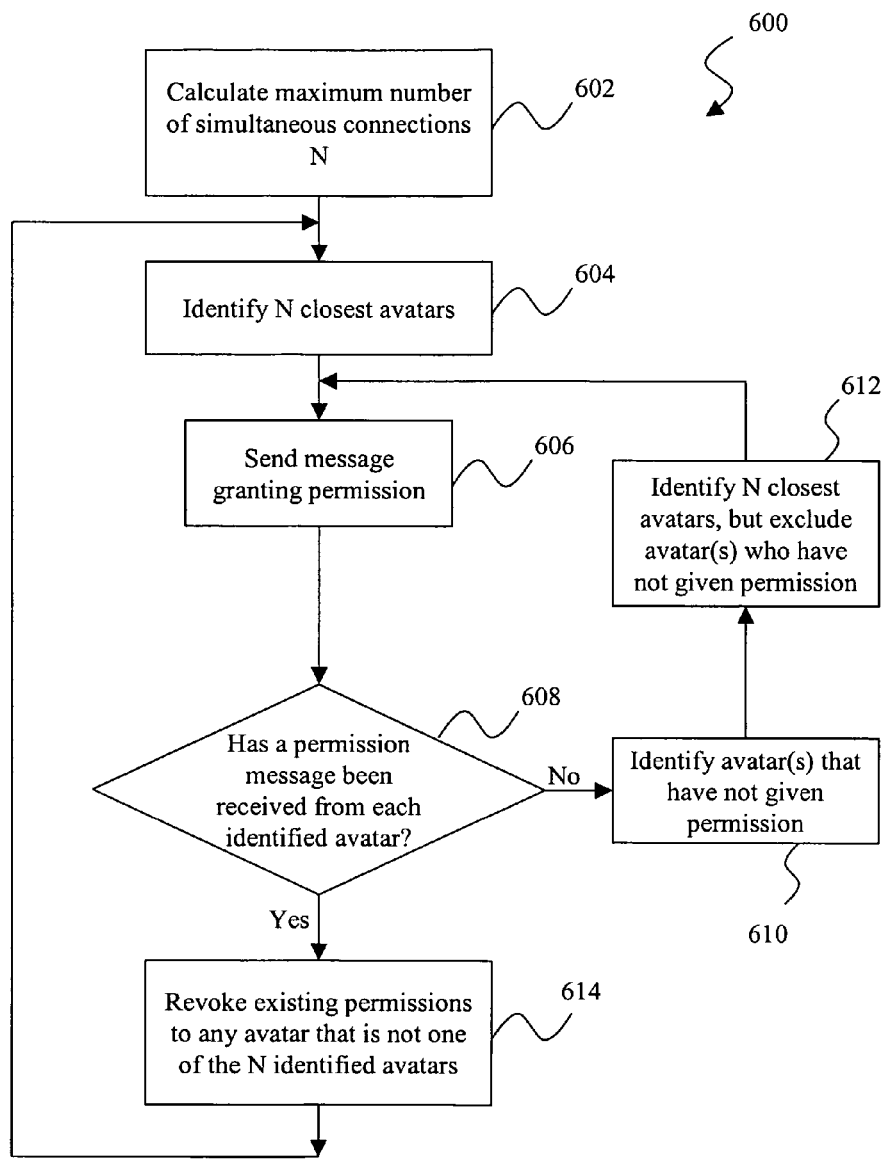
FIG. 6 is a flow chart of yet another embodiment of a method for client-side management of connections.
Figure 7:
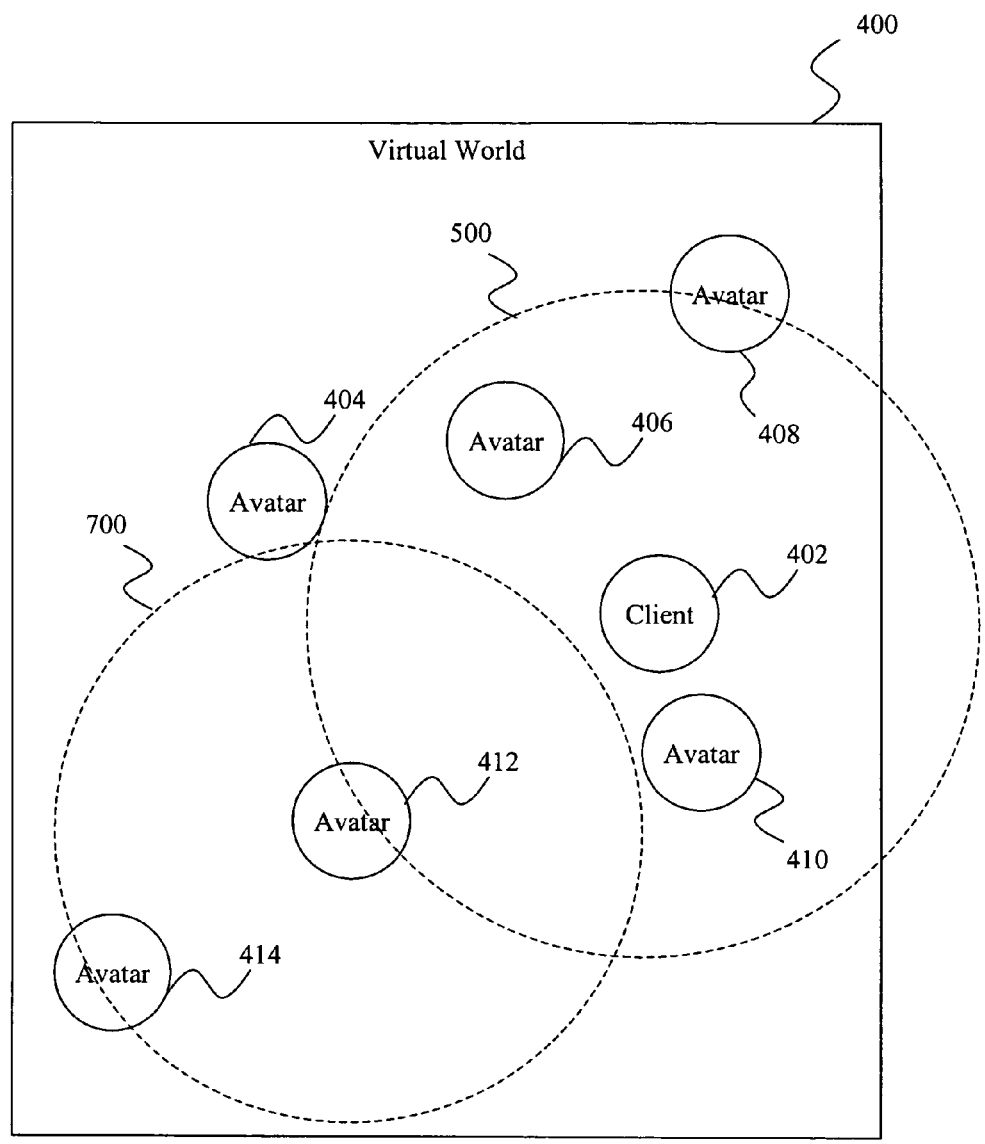
FIG. 7 illustrates an exemplary virtual world environment within which the method of FIG. 6 may be used to control connections between avatars.

Referring now to FIGS. 6 and 7, in another embodiment, a method 600 may be used to avoid counting an avatar among the N identified avatars if the client does not receive a reciprocating permission message from the avatar. In steps 602, 604 and 606, a maximum number of simultaneous connections N may be calculated, the N closest avatars may be identified, and a permission message may be sent to each avatar as previously described.

In step 608, a determination may be made as to whether a permission message has been received from each identified avatar. Predefined parameters may be used when making the determination. For example, the determination may be made after a predefined period of time has elapsed from the sending of the permission message by the client. If no permission message has been received by the client, the one or more avatars from which permission has not been received are identified in step 610. In step 612, the N closest avatars are again identified, but the avatars from which permission has not been received by the client are excluded from the N avatars.

With additional reference to FIG. 7, the client 402 has sent permission to four avatars 406, 408, 410, and 412, as illustrated by the circle 500. However, the avatar 412 may be able to establish only two simultaneous connections (i.e., N=2), as illustrated by the circle 700. The avatar 412 has sent permission to the two closest avatars 404 and 414, but not to the avatar 402. Accordingly, the client 402 will not receive a permission message from the avatar 412 and, using the method 600, may recalculate the closest number of avatars while excluding the avatar 412 in step 612. This recalculation may identify the avatars 406, 408, and 410 (originally identified), as well as the avatar 404 (newly identified because of the exclusion of the avatar 412). In this manner, the client computer 202 may maximize the number of connections, rather than using one of its available channels for the avatar 412, which will not communicate with it.

In step 606, the client 402 may send messages to the avatars 404, 406, 408, and 410, although it is understood that avatars already having permission may not receive an additional message, as previously described. Accordingly, a message may only be sent to the avatar 404. In step 608, the method may again determine whether a permission message has been received from each of the identified avatars. If not, the method 600 may repeat steps 610, 612, 606, and 608 until N connections have been established. It is understood that connections may be established and active during the execution of the method 600. In step 614, existing permissions to avatars that are not among the N identified avatars may be revoked. In some embodiments, the revocations may occur at different times. For example, revocation of permission sent to avatars that do not reciprocate with permission may occur between steps 610 and 612. This prevents these avatars from sending information to the client 202 prior to the next execution loop of the method 600. As previously described, a permission table may be used by the computer 202, although an additional entry may be created to track received permission messages.

Figure 8:
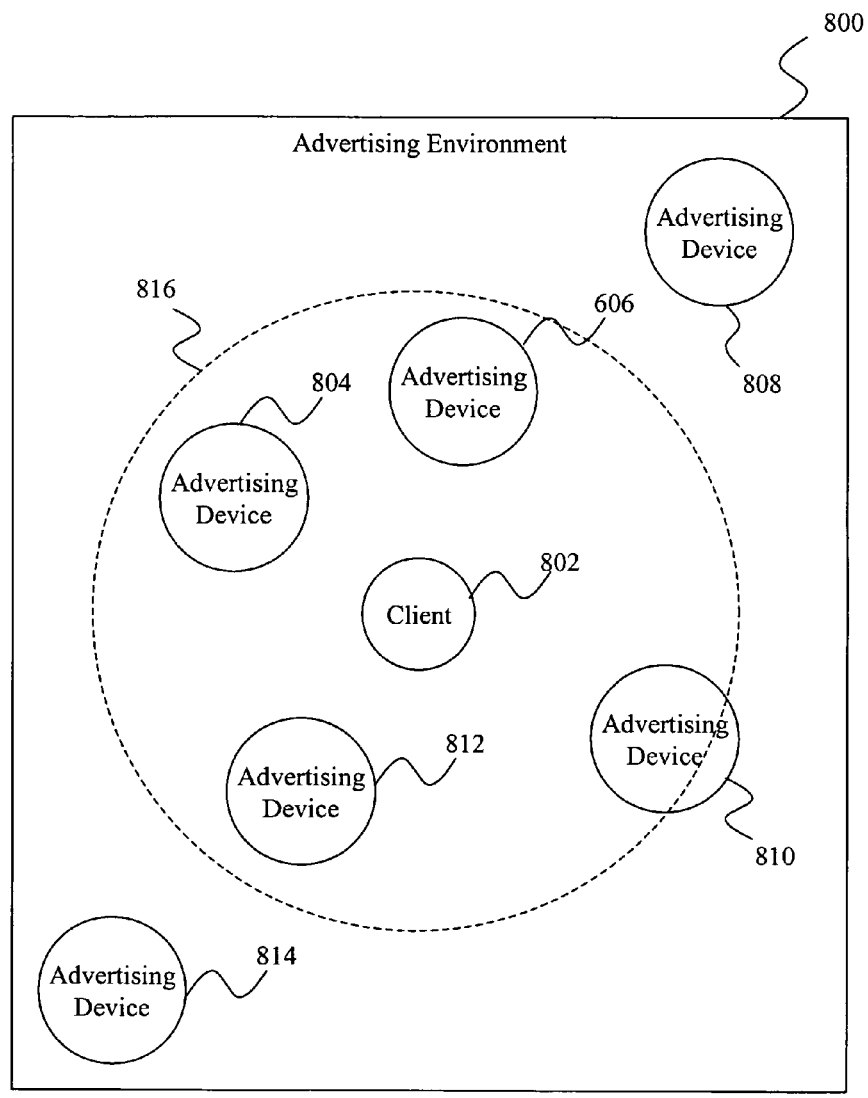
FIG. 8 illustrates an exemplary advertising environment within which the methods of FIGS. 1, 3, and 6 may be implemented.

Referring now to FIG. 8, another embodiment illustrates an advertising environment 800. The advertising environment includes a client 802 and multiple advertising devices 804, 806, 808, 810, 812, and 814 configured to broadcast advertising to the client. The client 802 may be a computer (e.g., a laptop or other portable computer), a PDA, a cellular telephone, or any other device capable of communicating with one or more other devices.

In the present illustration, the client 802 is moving relative to the advertising devices 804-814, which may be stationary. For example, the client 802 may be carried by a user (not shown) who is walking down a street or in a shopping mall. The advertising devices 804-814 may be located inside stores, and may be broadcasting information related to various goods for sale in the store in which the device is located.

As the client 802 moves relative to the advertising devices 804-814, the client may calculate a maximum number of simultaneous connections, grant and revoke permission, and perform other activities as previously described. Furthermore, the client 802 may use predefined permission rules to block some or all such advertising. Accordingly, the previously described methods may be used by a client in an advertising environment to manage data connections with multiple advertising devices.

The present disclosure has been described relative to a preferred embodiment. Improvements or modifications that become apparent to persons of ordinary skill in the art only after reading this disclosure are deemed within the spirit and scope of the application. It is understood that several modifications, changes and substitutions are intended in the foregoing disclosure and in some instances some features of the disclosure will be employed without a corresponding use of other features. For example, some steps described with respect to various embodiments may be performed in a different order or removed entirely. Furthermore, additional steps may be added. Accordingly, it is appropriate that the appended claims be construed broadly and in a manner consistent with the scope of the disclosure.

What is claimed is:

1. A method for client-side management of communications channels, the method comprising:
   determining a maximum number of simultaneous connections N supportable by a client to other entities within a virtual world controlled by a server based on a connection speed of the client to a network and a processor speed of a central processing unit within the client;
   identifying between one and N entities that meet a predefined criterion from a plurality of entities, the plurality of entities and the client being represented by different avatars within the virtual world controlled by the server;
   granting permission to the identified entities to communicate with the client by sending a permission message from the client to each of the identified entities; and
   revoking permission to communicate with the client held by entities of the plurality of entities that are not among the identified entities by sending a revocation message from the client to each of the entities that are not among the identified entities,
   wherein the determining, identifying, granting, and revoking steps are performed by the client;
   wherein the predefined criterion is a distance to the client within the virtual world controlled by the server, wherein the plurality of entities and the client are represented by the different avatars within the virtual world such that the distances between each of the plurality of entities and the client are calculated using coordinate information of the avatars within the virtual world;
   repeating the identifying, granting, and revoking steps as the avatars move about the virtual world.

2. The method of claim 1 further comprising:
   determining whether the client has received permission from each of the identified entities to communicate with each entity; and
   if permission has not been received from one of the identified entities, identifying between one and N entities that meet the predefined criterion, wherein the identifying excludes the previously identified entity from which permission has not been received.

3. The method of claim 1, further comprising identifying one or more of the identified entities that meet a second predefined criterion.

4. The method of claim 3, wherein the granting permission to communicate with the client is limited to the one or more identified entities meeting the second criterion.

5. The method of claim 3, wherein the revoking permission to communicate with the client includes the one or more identified entities not meeting the second criterion.

6. The method of claim 3, wherein the second predefined criterion is based on a hardware or software characteristic of the identified entity.

7. The method of claim 1, further comprising determining whether the identified entities have permission to communicate with the client and granting permission to communicate with the client to the identified entities that are determined to not have permission to communicate with the client.

8. The method of claim 7, wherein determining whether the identified entities have permission to communicate with the client comprises maintaining a permission table associating each of the entities with a first indicator representing whether permission to communicate with the client has been granted by the client.

9. The method of claim 8, wherein the permission table associates each of the identified entities with a second indicator representing whether permission to communicate with the entity has been granted by the entity.

10. The method of claim 1, wherein the predefined criterion includes a hardware or software characteristic of each of the plurality of entities.

11. A method for client-side management of communications channels, the method comprising:
    determining a maximum number of simultaneous connections N supportable by a client to other entities within a virtual world;
    identifying between one and N entities that meet a predefined criterion from a plurality of entities within the virtual world;
    determining whether the identified entities have permission to communicate with the client;
    granting permission to communicate with the client to the identified entities that do not have permission to communicate with the client; and
    revoking permission to communicate with the client to those entities of the plurality of entities that are not among the identified entities,
    wherein the determining, identifying, granting, and revoking steps are performed by the client;
    wherein the predefined criterion is a distance to the client within the virtual world, wherein the plurality of entities and the client are represented by different avatars within the virtual world such that the distance between each of the plurality of entities and the client are calculated using coordinate information of the avatars within the virtual world;

repeating the identifying, determining whether the identified entities have permission to communicate with the client, granting, and revoking steps as the avatars move about the virtual world.

12. The method of claim 11 further comprising:
determining whether the client has permission to communicate with each of the identified entities; and
if the client does not have permission to communicate with one or more of the identified entities, identifying between one and N entities that meet the predefined criterion, wherein the identifying excludes the one or more identified entities the client does not have permission to communicate with.

13. The method of claim 11 further comprising:
identifying one or more of the identified entities that meet a second predefined criterion;
wherein the granting permission to communicate with the client is limited to the one or more identified entities meeting the second criterion;
wherein the revoking permission to communicate with the client includes the one or more identified entities not meeting the second criterion.

14. The method of claim 13, wherein the second predefined criterion is based on a hardware or software characteristic of the identified entity.

15. The method of claim 11, wherein determining whether the identified entities have permission to communicate with the client further comprises maintaining a permission table associating each of the entities with a first indicator representing whether permission to communicate with the client has been granted by the client.

16. The method of claim 15, wherein the permission table associates each of the entities with a second indicator representing whether permission to communicate with the entity has been granted by the entity.

* * * * *